E. A. Robbins,
Tuning Musical Instruments,
No. 13,044. Patented June 12, 1855.
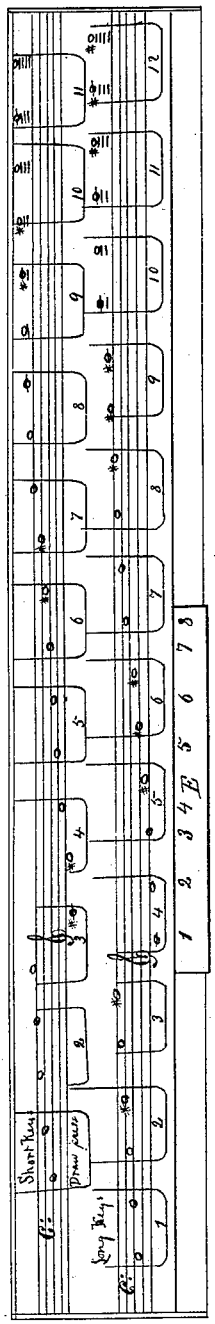
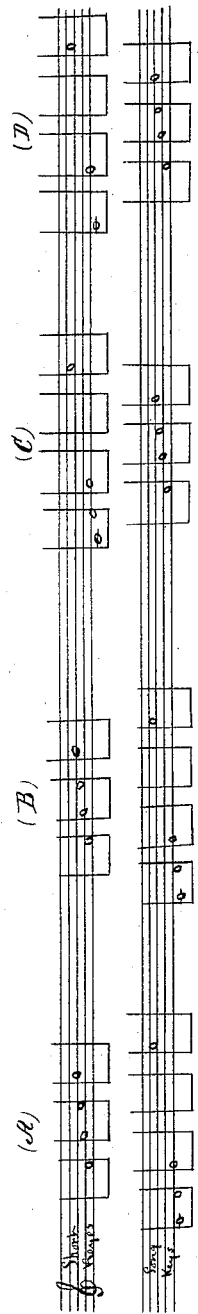
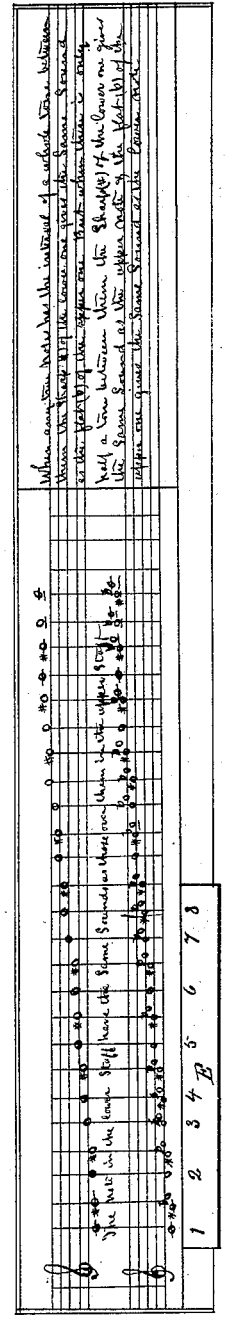
Fig. 1
Fig. 2
Inventor;
E. A. Robbins

UNITED STATES PATENT OFFICE.

E. A. ROBBINS, OF ROCHESTER, NEW YORK.

METHOD OF TUNING ACCORDIONS.

Specification of Letters Patent No. 13,044, dated June 12, 1855.

*To all whom it may concern:*

Be it known that I, EDGAR A. ROBBINS, of Rochester, in the county of Monroe, in the State of New York, have invented a new and useful Scale for the Accordion or Flutina; and I do hereby declare that the following is full and exact description thereof, reference being had to accompanying drawings and to the letters of reference marked thereon.

The nature of my invention consists in so tuning the reeds of an accordion or flutina, that by learning four modes or forms of fingering, the performer is enabled to play twelve scales, any number of octaves within the compass of the instrument. This mode of tuning gives facilities for harmony in all keys, and renders the performance of music in the various scales perfectly simple.

To enable others to make and use my invention, I will proceed to describe its construction and operation.

I construct an accordion or flutina after the plan of the French semitoned instruments without the double semitone key, and apply my invention by simply tuning the reeds, as shown by Figure 1 in the accompanying drawings, which gives a view of the keys of my twelve keyed æolian flutina, showing all the notes upon the staff and keys, and also the motion of the bellows necessary to produce them.

Fig. 1 shows that as the scale of C, fingers, the scales of E and A♭ finger, that as D fingers, so do the scales of F and B♭ as E♭ finger, so do those of G, and B, and as the scale of F finger those of A and D♭ also finger, thus requiring but four modes or forms of fingering to perform the twelve major scales. The same advantages of fingering as above will be desired, should we found our basis (C) for the chromatic scale, upon any other key than that shown in Fig. 1, or with the reverse motion of the bellows.

What I claim as my invention and desire to secure by Letters Patent is—

Such mode of tuning the reeds of accordions and flutinas, as will require but four modes or forms of fingering, to perform twelve scales any number of octaves within the compass of the instrument, as above described.

E. A. ROBBINS. [L. S.]

Signed in presence of—
JOHN PHIN,
J. L. SINGLES.